United States Patent
Goto

(10) Patent No.: US 7,792,842 B2
(45) Date of Patent: Sep. 7, 2010

(54) APPARATUS, METHOD AND COMPUTER PROGRAM PRODUCT FOR OUTPUTTING INFORMATION

(75) Inventor: Kazuyuki Goto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 382 days.

(21) Appl. No.: 11/855,491

(22) Filed: Sep. 14, 2007

(65) Prior Publication Data

US 2009/0030914 A1 Jan. 29, 2009

(30) Foreign Application Priority Data

Feb. 28, 2007 (JP) .............................. 2007-049433

(51) Int. Cl.
 *G06F 7/00* (2006.01)
 *G06F 17/30* (2006.01)
 *G06F 15/16* (2006.01)
(52) U.S. Cl. .................. 707/750; 707/705; 707/736
(58) Field of Classification Search .................. 707/100, 707/200; 379/355, 355.01–355.06, 354
See application file for complete search history.

(56) References Cited

U.S. PATENT DOCUMENTS 5,592,546 A * 1/1997 Takahashi .............. 379/355.05
7,280,652 B2 * 10/2007 Bocking et al. ........ 379/355.02

FOREIGN PATENT DOCUMENTS

| JP | 2000-113064 | 4/2000 |
| JP | 2000-259529 | 9/2000 |
| JP | 2001-117940 | 4/2001 |

* cited by examiner

*Primary Examiner*—Cam Y Truong
*Assistant Examiner*—Cecile Vo
(74) *Attorney, Agent, or Firm*—Turocy & Watson, LLP

(57) ABSTRACT

In an information presenting apparatus, a frequency of usage of each term contained in one text or more is calculated for each user who has implemented an operation onto the text. Based on the frequencies of usage of the terms, the frequencies of usage of each term are compared between a specific user and other users to find a difference therebetween, and terms for which the difference is equal to or larger than a predetermined value are presented.

7 Claims, 15 Drawing Sheets

FIG.5

| USER ID | ACCOUNT | PASSWORD | NAME | E-MAIL ADDRESS |
|---|---|---|---|---|
| u1 | taro_yamada | * * * * * | TARO YAMADA | taro_yamada@xxx.co.jp |
| u2 | hanako_suzuki | * * * * * | HANAKO SUZUKI | hanako_suzuki@xxx.co.jp |
| u3 | jiro_watanabe | * * * * * | JIRO WATANABE | jiro_watanabe@xxx.co.jp |
| ... | ... | ... | ... | ... |

FIG.6

| TEXT ID | AUTHOR USER ID | CREATION DATE AND TIME | NAME |
|---|---|---|---|
| d1 | u1 | 2006/07/15 15:30:23 | msg012114xxx |
| d2 | u2 | 2006/07/17 10:42:39 | file:///c:/docs/xxx.pdf |
| d3 | u3 | 2006/07/19 13:18:25 | ftp://xxx.co.jp/files/xxx.txt |
| d4 | (NA) | 2006/07/24 16:17:52 | http://yyy.com/report2006.html |
| ... | ... | ... | ... |

FIG.7

| USER ID | TEXT ID | DATE AND TIME | TYPE |
|---|---|---|---|
| u1 | d1 | 2006/07/15 15:30:23 | CREATE |
| u3 | d1 | 2006/07/15 15:35:43 | BROWSE |
| u2 | d2 | 2006/07/17 10:42:39 | CREATE |
| u3 | d3 | 2006/07/20 09:17:13 | BROWSE |
| u1 | d4 | 2006/07/28 13:26:52 | BROWSE |
| u3 | d3 | 2006/07/31 14:51:05 | BROWSE |
| ... | ... | ... | ... |

FIG.8A

| TERM ID | CHARACTERS OF TERMS | TEXT ID |
|---|---|---|
| t1 | TODAY | d1, d3, d4, ... |
| t2 | MEETING | d1, d8, d9, ... |
| t3 | SUBJECT | d1, d9, d11, ... |
| t4 | PROJECT | d1, d2, d13, ... |
| t5 | PROPOSAL | d1, d2, d3, ... |
| ... | ... | ... |

FIG.8B

| TEXT ID | TERM ID |
|---|---|
| d1 | t1, t2, t3, t4, t5, ... |
| d2 | t10, t4, t8, t29, t5, ... |
| d3 | t1, t7, t5, t31, t24, ... |
| ... | ... |

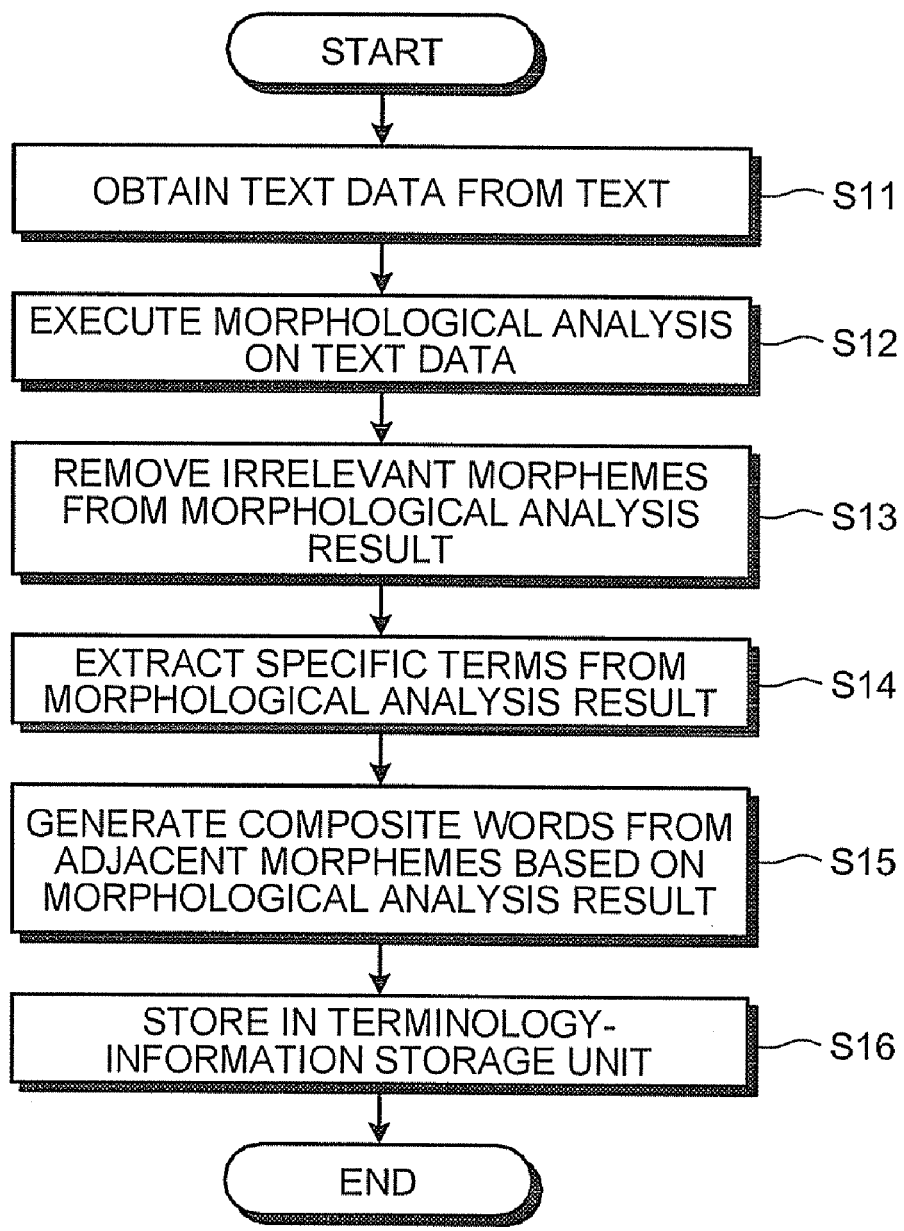

FIG.14

SUBJECT: 6TH PLANNING MEETING (JULY 21)
FROM: ICHIRO SUZUKI <ichiro_suzuki@foo.bar.com>

TO: STAFF OF PLANNING DEPARTMENT

HELLO. THANK YOU FOR YOUR COOPERATION ALL THE TIME.

THE PLAN STUDY MEETING THAT WE MENTIONED THE OTHER DAY REGARDING THE INTERNAL CONTROL SOLUTION BUSINESS WILL BE HELD AS SPECIFIED BELOW, AND WE ARE HOPING TO SEE YOU THERE.
MR. YAMASHITA FROM Y CO., LTD. WILL DELIVER A LECTURE IN THIS MEETING. ANY STAFF OUTSIDE THE PLANNING TEAM IS ALSO WELCOMED.

DATE AND TIME: FRIDAY, JULY 21, 3-5PM
PLACE: MEETING ROOM #304 OF HEADQUARTERS
TOPICS:
(1) JAPANESE SOX LAW (STUDY SESSION)
(2) DEVELOPMENT OF PLAN
    (PROGRESS REPORT)
(3) LECTURE
    (MR. YAMASHITA FROM Y CO., LTD.)

~ TERMS AND WHO TO ASK ~

| INTERNAL CONTROL | ...MAEDA |
| Y CO., LTD. | ...HASEGAWA |
| JAPANESE SOX LAW | ...KONDO, MAEDA |

SUBJECT: 6TH PLANNING MEETING (JULY 21)
TO:  TAKEO AOKI <takeo_aoki@foo.bar.com>
     HIROSHI KURODA <hiroshi_kuroda@foo.bar.com>
     YUMI SHIRAKAWA <yumi_shirakawa@foo.bar.com>

TO: STAFF OF PLANNING DEPARTMENT

HELLO. THANK YOU FOR YOUR COOPERATION ALL THE TIME.

THE PLAN STUDY MEETING THAT WE MENTIONED THE OTHER DAY REGARDING THE INTERNAL CONTROL SOLUTION BUSINESS WILL BE HELD AS SPECIFIED BELOW, AND WE ARE HOPING TO SEE YOU THERE.
MR. YAMASHITA FROM Y CO., LTD. WILL DELIVER A LECTURE IN THIS MEETING. ANY STAFF OUTSIDE THE PLANNING TEAM IS ALSO WELCOMED.
(E4)
(E5)

DATE AND TIME: FRIDAY, JULY 21, 3-5PM
PLACE:         MEETING ROOM #304 OF HEADQUARTERS
TOPICS:
  (1) JAPANESE SOX LAW (STUDY SESSION)
  (2) DEVELOPMENT OF PLAN
      (PROGRESS REPORT)
  (3) LECTURE
      (MR. YAMASHITA FROM Y CO., LTD.)
(E6)                                    (E5)

A3

~EXPLANATION REQUIRING TERMS AND WHO TO GIVE EXPLANATION~

INTERNAL CONTROL    ...MAEDA
Y CO., LTD.         ...HASEGAWA
JAPANESE SOX LAW    ...KONDO, MAEDA

APPARATUS, METHOD AND COMPUTER PROGRAM PRODUCT FOR OUTPUTTING INFORMATION

CROSS-REFERENCE TO RELATED APPLICATIONS

This application is based upon and claims the benefit of priority from the prior Japanese Patent Application No. 2007-49433 filed on Feb. 28, 2007; the entire contents of which are incorporated herein by reference.

BACKGROUND OF THE INVENTION

1. Field of the Invention

The present invention relates to an apparatus, a method and a computer program product for presenting information that provide information within an organization.

2. Description of the Related Art

The recent proliferation of computer networks has been increasing opportunities of using electronic means such as electronic mail and text databases as an information sharing means when workers of an organization are working in collaboration or communicating with each other. When adopting such an electronic information sharing means, however, information tends to be shared less smoothly than when discussing at a face-to-face meeting or consulting over the phone in a customary way. For instance, when communicating with an unfamiliar person or joining a project as a new team member, one may encounter a jargon (such as a technical term, document name, job name, and proper name) in a document or e-mail somebody has prepared, which makes it difficult to fully understand the content. On the other hand, a word that is used in one's document or e-mail may not be understood by the receiver.

As a method of sharing information in an organization, terminology and knowledge necessary at work or in communications may be compiled into a glossary that can be shared among the team members of the job to achieve smooth information sharing. However, compiling a glossary from scratch and updating the glossary by adding new entries creates a complicated task that requires manpower.

To solve the above problem, a technology called "know-who system" has been used. The know-who system in general includes a database of specialists (database of name and contact information as well as individual profiles of expertise) that is manually or automatically created. In response to a question input by a user on a term or the like, the system searches for a person whose profile corresponds to this question through the specialist database and introduces this person as a specialist who has knowledge about the question to the user.

Various modes have been suggested for the know-who system. For instance, JP-A 2001-117940 (KOKAI) discloses a technology of, instead of actively using a specialist database, searching through information such as documents prepared by different users in response to a question input by a user and providing the user with personal information extracted from the searched information as information on a specialist who has knowledge about the question.

Moreover, various methods have been suggested to automatically create user profiles, or in other words, information that indicates individual expertise and interests, which is usable in the know-who system or a conventional information filtering system.

JP-A 2000-113064 (KOKAI) also discloses a technology of obtaining user profiles. In this technology, for example, texts created or browsed by a user, and e-mails transmitted or received by the user are incorporated, and words with statistically significant frequencies of appearance are extracted from the text information of the texts and e-mails. These words are regarded as characteristic words that indicate expertise and interests of the user. The user profile is established by, for example, a vector expression of the words (where each word is a dimension of a vector, and a magnitude of the dimensional component is expressed by a value calculated from the frequency of appearance of the word in the text or the like). Furthermore, 2000-259529 (KOKAI) discloses a technology of actively creating a profile of each user in a specific group of users by using words characterizing the user.

When seeking an understanding of an issue of in an unfamiliar field, it often happens that the user actually does not recognize what the user oneself wants to know. In other words, the user is often unaware that there are things that the user does not know now but should know for the future works or communications. If this is the case, a technology using the know-who system as disclosed by JP-A 2001-117940 (KOKAI) or other references does not allow the user to input an appropriate search condition, nor does it bring to the user's attention that there is a term the user should look up on the know-who system in the first place. Furthermore, the user does not realize that a word or knowledge the user is familiar with is not understood by other users.

The technologies disclosed by JP-A 2000-113064 (KOKAI) and JP-A 2000-259529 (KOKAI) are intended for presentation of information on knowledge and interest of a user, and thus mutual relation with other users is not taken into consideration. For example, there is a problem that these technology do not make the user aware of terms that the user currently does not have knowledge of or interest in but may need to know in the future work or communications. Similarly, the user may be unaware that a term that the user has knowledge of or interest in is not understood by or not of interest of a partner of the job or communications.

SUMMARY OF THE INVENTION

According to one aspect of the present invention, an apparatus for presenting information includes a text-information storage unit that stores a plurality of texts; each text having text identification information; a term extracting unit that extracts terms contained in the text from each of the plurality of the texts stored in the text-information storage unit; a terminology-information storage unit that stores the terms extracted by the term extracting unit and text identification information of the text from which the terms are extracted in association with each other; a history-information acquiring unit that acquires history information indicating a history of operations performed on the text; a history-information storage unit that stores the history information, user identification information of users who implement the operations, and the text identification information of texts that are subjected to the operations in association with each other; a usage-frequency calculating unit that calculates for each of the user identification information stored in the history-information storage unit, a frequency of usage of each of the terms contained in the text indicated by the text identification information that is associated with the user identification information, based on the terms for each text stored in the terminology-information storage unit; a term selecting unit that calculates a difference between the frequency of usage of each of the terms for the user identification information of a specific user and the frequency of usage of each of the terms for the user identification information of other users stored in the history-information storage unit, based on the frequency of usage of each of the terms, and selects terms for which the difference is equal to or larger than a predetermined value; and an information presenting unit that presents the terms selected by the term selecting unit.

According to another aspect of the present invention, a method for presenting information includes extracting terms contained in a text from each of a plurality of texts, each text having text identification information; storing the extracted terms and the text identification information of the text containing the extracted terms in association with each other; acquiring history information indicating a history of operations performed on the text; storing the history information, user identification information of users who implement the operations, and text identification information of texts that are subjected to the operations in association with each other; calculating for each of the stored user identification information, a frequency of usage of each of the terms contained in the text corresponding to the text identification information that is associated with the stored user identification information, based on the terms for each of the stored text identification information; calculating a difference between the frequency of usage of each of the terms for the stored user identification information of a specific user and the frequency of usage of each of the terms for the user identification information of other users, based on the frequency of usage of each of the terms, and selecting terms for which the difference is equal to or larger than a predetermined value; and presenting the selected terms.

A computer program product according to still another aspect of the present invention causes a computer to perform the method according to the present invention.

BRIEF DESCRIPTION OF THE DRAWINGS

FIG. 5 is a schematic diagram for an example of user information;

FIG. 6 is a schematic diagram for an example of text information;

FIG. 7 is a schematic diagram for an example of history information;

FIG. 8A is a schematic diagram for an example of terminology information;

FIG. 8B is a schematic diagram for another example of terminology information;

FIG. 9 is a flowchart of a term extracting process;

FIG. 14 is a flowchart for another example of a screen presenting terminology information;

FIG. 16 is a schematic diagram of another example of a screen presenting terminology information.

DETAILED DESCRIPTION OF THE INVENTION

Exemplary embodiments of an apparatus, a method and a computer program product for presenting information are explained below in detail with reference to the attached drawings.

Figure 1:
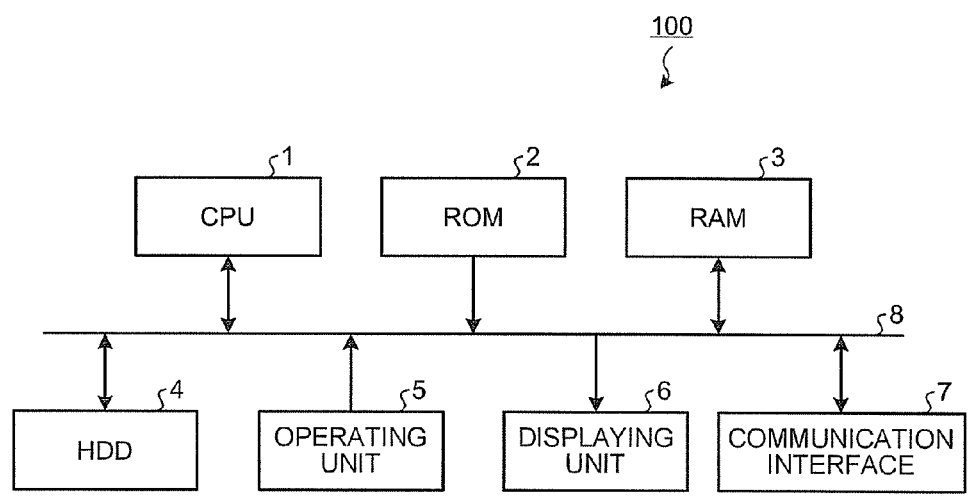
FIG. 1 is a schematic diagram for a hardware structure of an information presenting apparatus.

FIG. 1 is a block diagram of the hardware structure of an information presenting apparatus 100 according to an embodiment. The information presenting apparatus 100 includes a central processing unit (CPU) 1, a read only memory (ROM) 2, a random access memory (RAM) 3, a hard disk drive (HDD) 4, an operating unit 5, a displaying unit 6, a communication interface 7 and the like, and these components are connected to one another by a bus 8.

The CPU 1 executes various processes (such as a term extracting process, a frequency calculating process, a vector calculating process, and a terminology information presenting process, which will be described later) by using a certain area of the RAM 3 as a work area, together with various control programs stored in advance in the ROM 2 and the HDD 4 (hereinafter, these will be generically referred to as "storage unit"). The CPU 1 totally controls the operations of the components of the information presenting apparatus 100.

The ROM 2 stores therein programs and various configuration information in relation to the control of the information presenting apparatus 100 in a non-rewritable manner.

The RAM 3 is a storage device such as a synchronous DRAM (SDRAM). Because of its property of storing therein various data in a rewritable manner, the RAM 3 serves as a work area of the CPU 1, and plays a role of a buffer or the like.

The HDD 4 has a magnetically or optically recordable recording medium, and functions as a text-information storage unit 11, a user-information storage unit 12, a terminology-information storage unit 14, and a history-information storage unit 16 (see FIG. 2), which will be described later, to store various data therein.

The operating unit 5 includes various input keys and receives, as an input signal, information that the user inputs by operating the keys. The input signal is output to the CPU 1.

The displaying unit 6 includes a liquid crystal display (LCD) or the like, and displays various information thereon in accordance with a display signal from the CPU 1. The displaying unit 6 may be configured to form a touch panel together with the operating unit 5.

The communication interface 7 is an interface for communicating with external machines (systems). The communication interface 7 outputs various kinds of information received from an external machine to the CPU 1, and transmits various information output from the CPU 1, to the external machine.

Figure 2:
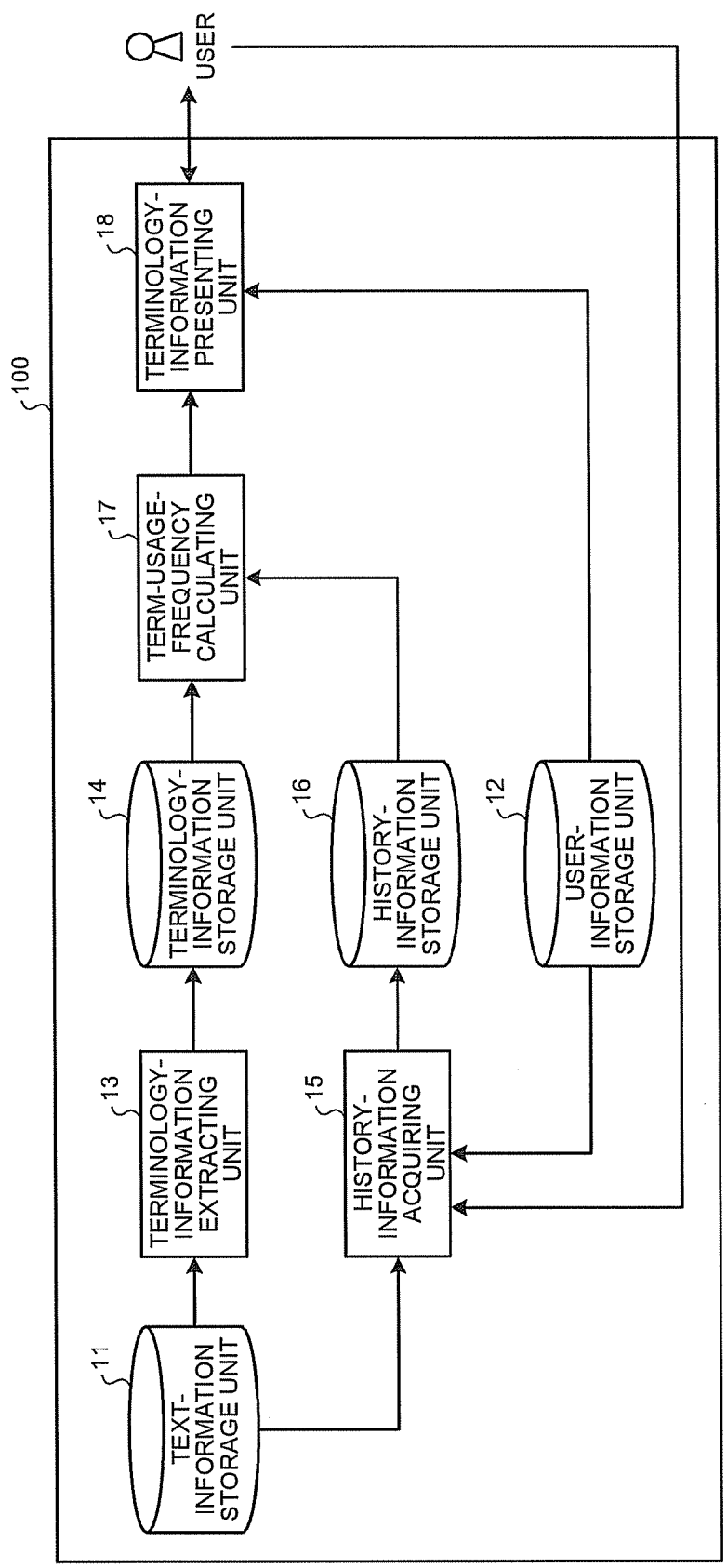
FIG. 2 is a schematic diagram for a functional structure of an information presenting apparatus according to an embodiment of the present invention.

FIG. 2 is a block diagram of the functional structure of the information presenting apparatus 100. The information presenting apparatus 100 includes the text-information storage unit 11, the user-information storage unit 12, a terminology-information extracting unit 13, the terminology-information storage unit 14, a history-information acquiring unit 15, the history-information storage unit 16, a term-usage-frequency calculating unit 17, and a terminology-information presenting unit 18. The terminology-information extracting unit 13, the history-information acquiring unit 15, the term-usage-frequency calculating unit 17, and the terminology-information presenting unit 18 are functional units realized in consort with certain programs stored in advance in the storage unit and the CPU 1.

The text-information storage unit 11 stores therein texts that include terms indicated by the information presenting apparatus 100. In addition, the text-information storage unit 11 stores text information including information such as authors of the texts and the dates of creation. The texts to be stored are not limited to the ones held in advance in the information presenting apparatus 100. The texts may be stored in an external computer connected to the information presenting apparatus 100 via a not-shown computer network. More specifically, the texts include e-mails transmitted and received on an e-mail system, articles shared on an external bulletin board system, and texts stored in an external file system and text database. The texts may be the ones prepared by the user of the information presenting apparatus 100, or ones prepared by a web site independent of the information presenting apparatus 100 and placed on public view, such as a web page provided by a web site on the Internet or an intranet.

The text-information storage unit 11 does not have to permanently store all the texts therein. For instance, texts such as e-mails may be stored temporarily during a process performed by the terminology-information extracting unit 13 at the time of transmission or reception, as described later.

The user-information storage unit 12 stores therein user information such as names and e-mail addresses of users who use the information presenting apparatus 100.

The terminology-information extracting unit 13 is a unit that extracts terms from the text information stored in the text-information storage unit 11. The extraction result is stored in the terminology-information storage unit 14 as terminology information.

The history-information acquiring unit 15 obtains history information indicating a history of operations performed when users create texts and save them in the text-information storage unit 11, or browse texts stored in the text-information storage unit 11. The obtained history information is stored in the history-information storage unit 16. In addition, the history-information acquiring unit 15 obtains the user information from the user-information storage unit 12.

The term-usage-frequency calculating unit 17 calculates the frequency of a specific user or user group (hereinafter, "user set") using each term by using the terminology information stored in the terminology-information storage unit 14 and the history information stored in the history-information storage unit 16. In other words, the calculation result obtained by the term-usage-frequency calculating unit 17 shows which user or of user set uses which term at what frequency.

Based on the calculation result of the term-usage-frequency calculating unit 17, the terminology-information presenting unit 18 displays terms useful for the user on the displaying unit 6. The terminology-information presenting unit 18 further identifies a specialist in relation to each term, from the user information stored in the user-information storage unit 12, and displays the result on the displaying unit 6. Presentation of information for the user is thereby achieved.

Figure 3:
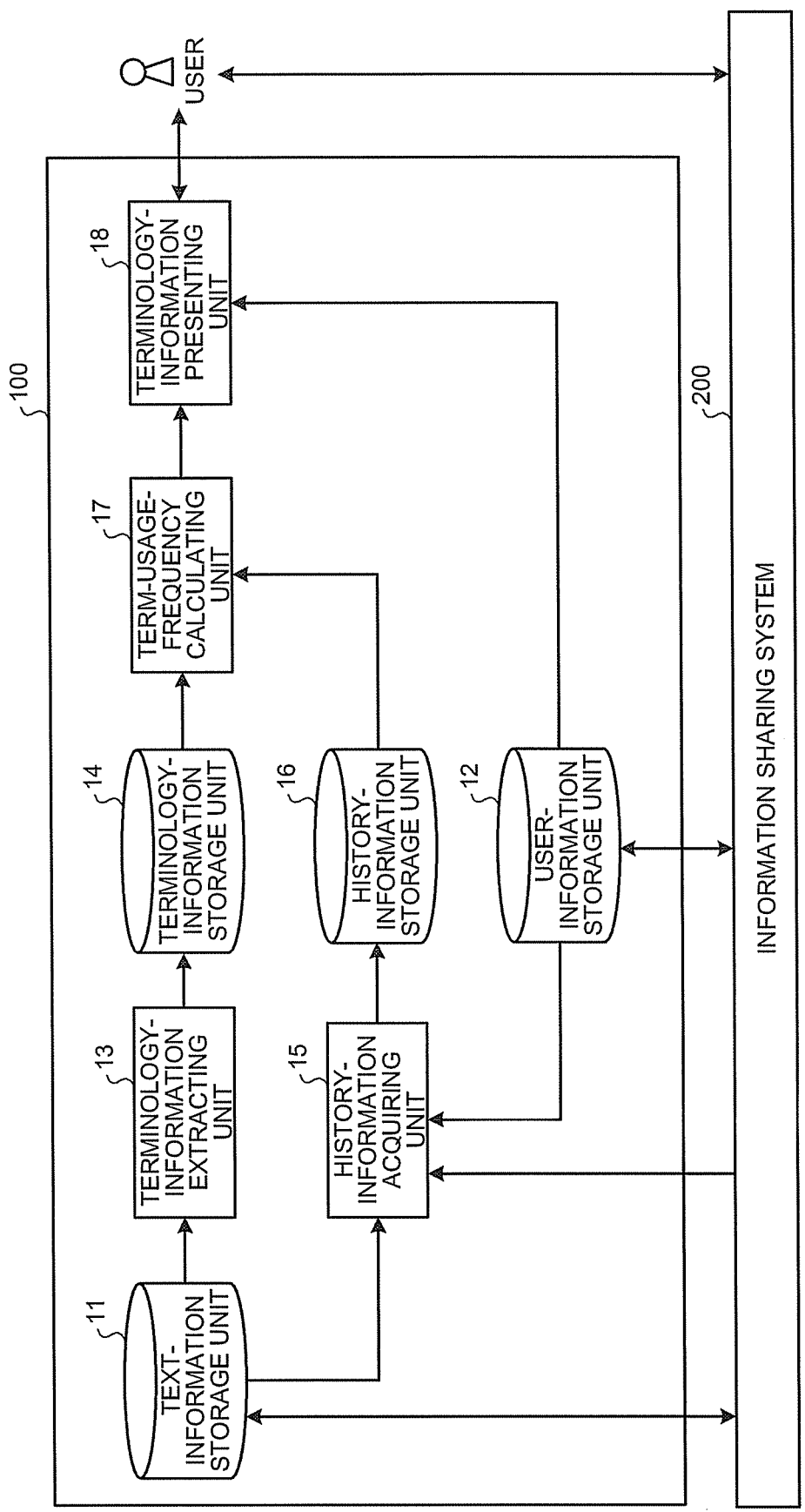
FIG. 3 is a schematic diagram for a functional structure of an information presenting apparatus according to another embodiment.

The information presenting apparatus 100 of FIG. 2 is illustrated as having the minimal and essential structure. As an embodiment more effective in conducting work or communications, the information presenting apparatus 100 may be combined with an information sharing system 200, as illustrated in FIG. 3.

The information sharing system 200 can be any system of the conventional technology. For example, a business system such as a workflow management system, a project management system, and a schedule management system; document searching services; a document revision management system; and a communication system such as a mailing list system and a bulletin board system may be adopted.

In general, the information sharing system 200 includes a memory device for storing and managing information of users who use the information sharing system 200 (user-information storage unit) and a memory device for storing text information (text-information storage unit). Further, the users create, save, and browse texts by use of the information sharing system 200, and thus the history-information acquiring unit 15 obtains history information of the operations performed on the texts by way of the information sharing system 200.

Figure 4:
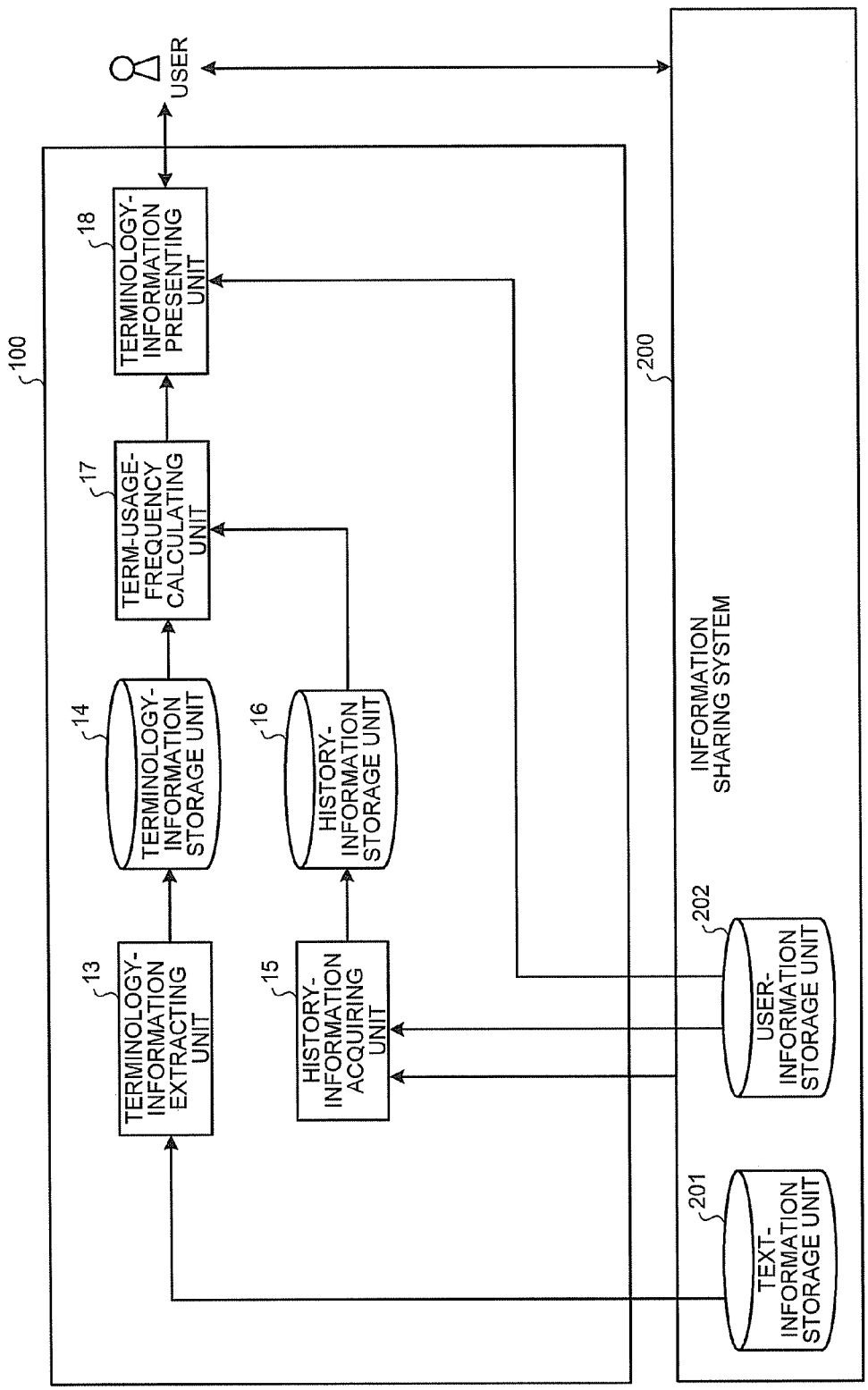
FIG. 4 is a schematic diagram for a functional structure of an information presenting apparatus according to still another embodiment.

FIG. 4 is a schematic diagram of another exemplary embodiment. The information sharing system 200 includes memory devices that correspond to the text-information storage unit 11 and the user-information storage unit 12 of the information presenting apparatus 100 illustrated in FIG. 2 (a text-information storage unit 201 and a user-information storage unit 202). The terminology-information extracting unit 13 of the information presenting apparatus 100 extracts terms from text information (texts) stored in the text-information storage unit 201 of the information sharing system 200. The history-information acquiring unit 15 obtains history information of operations performed over the texts by way of the information sharing system 200, and user information from the user-information storage unit 202 of the information sharing system 200. With such a structure, part of the functions of the information presenting apparatus 100 can be realized as part of the functions of the existing information sharing system 200.

In the structure of FIG. 4, the user and the information presenting apparatus 100, or the user and the information sharing system 200 may be connected by way of a local area network (LAN) or a computer network such as the Internet. In general, a client-server structure is preferred, where the information presenting apparatus 100 and the information sharing system 200 serve as servers and the user accesses the servers from an information processing terminal such as a personal computer (PC). The software program of the client side that the user uses on the information processing terminal may be any generally available application software such as a web browser and a mailer so that the history-information acquiring unit 15 can obtain operations that the user performs on such a program.

The information stored in the above information storage units is explained below with reference to FIGS. 5 to 8. It is assumed here that the information in each of the information storage units is stored and managed by, for example, a relational database in accordance with common items so that pieces of the information are associated with one another.

FIG. 5 is a schematic diagram of an example of the user information stored in the user-information storage unit 12. The user information includes user IDs, accounts, passwords, names, e-mail addresses and the like of users who use the information presenting apparatus 100 to identify each of the users.

The accounts and the passwords are data to be used for user identification or the like. It is assumed here that the information presenting apparatus 100 or the information sharing system 200 illustrated in FIG. 3 or 4 performs user identification on each user by use of the account and the password. The information presenting apparatus 100 according to this embodiment does not include a functional unit responsible for the user identification (user identifying unit), but the embodiment is not limited to such a configuration. The information presenting apparatus 100 may include a user identifying unit as a separate unit. Furthermore, if the user identification is to be conducted at the information sharing system 200 illustrated in FIG. 3 or 4, the information sharing system 200 is provided with a user identifying unit.

FIG. 6 is a schematic diagram of an example of text information stored in the text-information storage unit 11. The text information includes various items of information in association with text creation, such as text IDs for identifying each text, user IDs of the users who create the texts (author user IDs), dates and times at which the texts are created (creation dates and times), and names of texts uniquely given to individual texts.

The name column is filled in accordance with the types of texts and the memory management systems: message IDs are described for e-mails, path names are described for files on a file system, and storage locations such as URLs are described for files in relation to the FTP or HTTP services. In addition to those items, the latest update dates, sizes, MIME types, titles and other items may be included. The contents of texts, or in other words, text data may be stored in the text-information storage unit 11, or stored only temporarily when they are used for the term extracting process.

FIG. 7 is a schematic diagram of an example of the history information stored in the history-information storage unit 16. The items of the history information include user IDs of users who perform operations, text IDs that are subjected to the operations, operation dates and times, and types of operations. Common types of operations onto texts are "create" and "browse". In addition to these types, other operations may be obtained and stored in accordance with the types of texts: for instance, "reply" and "forward" may be incorporated for e-mails, and "revise" may be incorporated for the revision management system for text information.

FIGS. 8A and 8B are diagrams of examples of the terminology information stored in the terminology-information storage unit 14. According to the embodiment, the terminology information includes two data tables as indicated by FIG. 8A and FIG. 8B.

The data table of FIG. 8A holds terms in association with the texts including these terms. The items of the data table include IDs of these terms (term IDs), characters of the terms, and IDs of the texts that include the terms (text IDs). On the other hand, the data table of FIG. 8B holds texts in association with the terms included in the texts. The items of the data table include text IDs of the texts and term IDs of the terms that appear in the texts. The term IDs are stored in the data table of FIG. 8B in the order that corresponds to the order of appearance of the terms on the texts.

It is assumed, for example, the content of text ID d1 includes text data "The subject of today's meeting is the proposal of the project . . . ". In the term extracting process explained later, terms such as "today", t1; "meeting", t2; "subject", t3; "project", t4; and "proposal", t5 are extracted from the text data. As a result, each of the terms t1 to t5 is associated with text d1 in FIG. 8A.

As for text ID d1, the terms t1 to t5 included in this text are stored in association with the text dl in the order of appearance, as indicated in FIG. 8B. According to the embodiment, the terms are stored in the order of appearance on the text, but the data structure is not limited thereto. Any structure may be adopted as long as the order of appearance of terms is clearly shown. For instance, positions on the text where the terms appear (offsets) may be stored, or the terms may be stored in accordance with types of terms (for instance, single morpheme or composite word of two morphemes or more).

The operation of the terminology-information extracting unit 13 is now explained with reference to FIG. 9. FIG. 9 is a flowchart of a process of extracting terms from a text (term extracting process) at the terminology-information extracting unit 13.

First, the terminology-information extracting unit 13 obtains text data from the text information stored in the text-information storage unit 11 (character strings often referred to as plain text) (step S11). For example, texts prepared in an application such as a word processor and other texts such as for presentation materials are composed in a format called rich text. A specific application program interface (API) is used to acquire text data from such text files. For HTML texts, a tag removing process and the like is performed in advance to acquiring text data. For e-mails, text data is obtained from the subjects and main bodies thereof.

Next, the terminology-information extracting unit 13 executes a morphological analysis onto the text data to obtain information on the morphemes and word classes thereof (step S12). A conventional technology can be adopted for the morphological analysis.

Then, the terminology-information extracting unit 13 removes morphemes of irrelevant word classes such as prepositions from the morphologically analyzed text data (hereinafter, "morphological analysis result") to extract morphemes of relevant word classes, such as nouns (step S13).

The text data often includes proper names such as names of organizations, documents, and products, which serve as keywords to understand the texts. The terminology-information extracting unit 13 therefore extracts specific terms such as "X Manufacturing Co., Ltd.", "Software Inspection Specification", and "RD-X11" from the morphological analysis result, based on certain prefixes, suffixes, types of characters and the like by use of a conventional information extracting technique (step S14).

Moreover, the terminology-information extracting unit 13 generates composite words (terms) by combining morphemes that are adjacent to each other in the morphological analysis result (step S15). For instance, terms such as "internal-control" and "risk-management" are composite words of morphemes "internal" and "control", and "risk" and "managements". These terms are also important to understand the text. Thus, at step S15, adjacent morphemes are combined into a composite word.

Thereafter, the terminology-information extracting unit 13 stores the words extracted and generated at steps S13, S14, and S15 into the terminology-information storage unit 14 (step S16), and terminates the process.

In the term extracting process, the operations at steps S13, S14, and S15 do not always have to be executed in the order as shown in FIG. 9, but may be suitably changed.

A known method may be used for the process of judging whether a combination of morphemes is a composite word at step S15. For instance, the method may be such that the frequency of appearance of each morpheme in isolation is compared with the frequency of co-occurrence of adjacent morphemes so that the combination of the morphemes is determined as a composite word when the latter frequency is statistically significantly higher. Such a process is based on the premise that there are relatively a large number of texts. Hence, the operation at step S15 may be executed separately from the operations at other steps; for example, every hundreds of entries of new texts may be subjected to the operation in a collective manner.

The terms obtained at steps S13, S14, and S15 are stored in the terminology-information storage unit 14 in the forms as indicated in FIGS. 8A and 8B. The words may be sorted, for example, according to a single morpheme or a composite word of morphemes, as explained above, when they are stored. When the terms are extracted by the information extracting method as explained for step S14, categories of terms, such as names of organizations, documents, or products, may be attached to the terms when they are stored.

Figure 10:
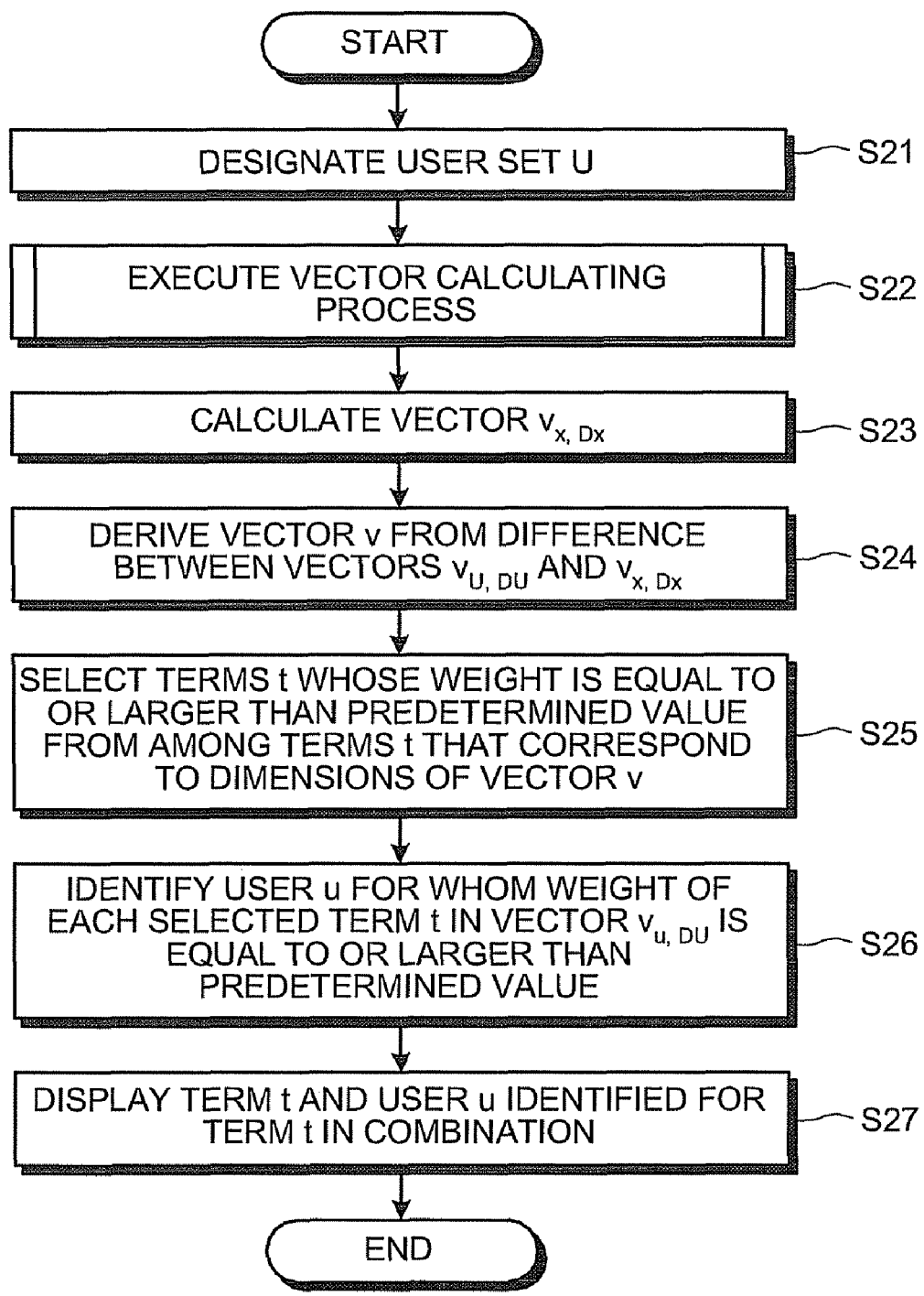
FIG. 10 is a flowchart of a terminology information presenting process.

Next, with reference to FIG. 10, the explanation focuses on the operation of presenting a specific term among terms included in texts in accordance with the characteristics of a reference user. FIG. 10 is a flowchart of the process of presenting the terminology information. In this process, a situation is assumed, where a reference user x joins a set U of users u and starts working or communicating with them.

When the user x designates the user set U by use of the operating unit 5 and the designation signal is input into the CPU 1 (step S21), the term-usage-frequency calculating unit 17 executes a vector calculating process on the user set U and each of the users u who belong to the user set U (step S22). As a result, vectors v[d], v[u, DU], and v[U, DU], which will be described later, are obtained.

A text set DU shared by the user set U may be, for example, a set of texts shared by the users u, or a set of texts that a certain number or more of people among the users u of the user set U have used before. If the information presenting apparatus 100 is configured in conjunction with the external information sharing system 200 as illustrated in FIG. 3 or 4, the information sharing system 200 may be configured to define the ranges of user set U and text set DU for the user set U. The vector calculating process at step S21 is explained below with reference to FIG. 11.

Figure 11:
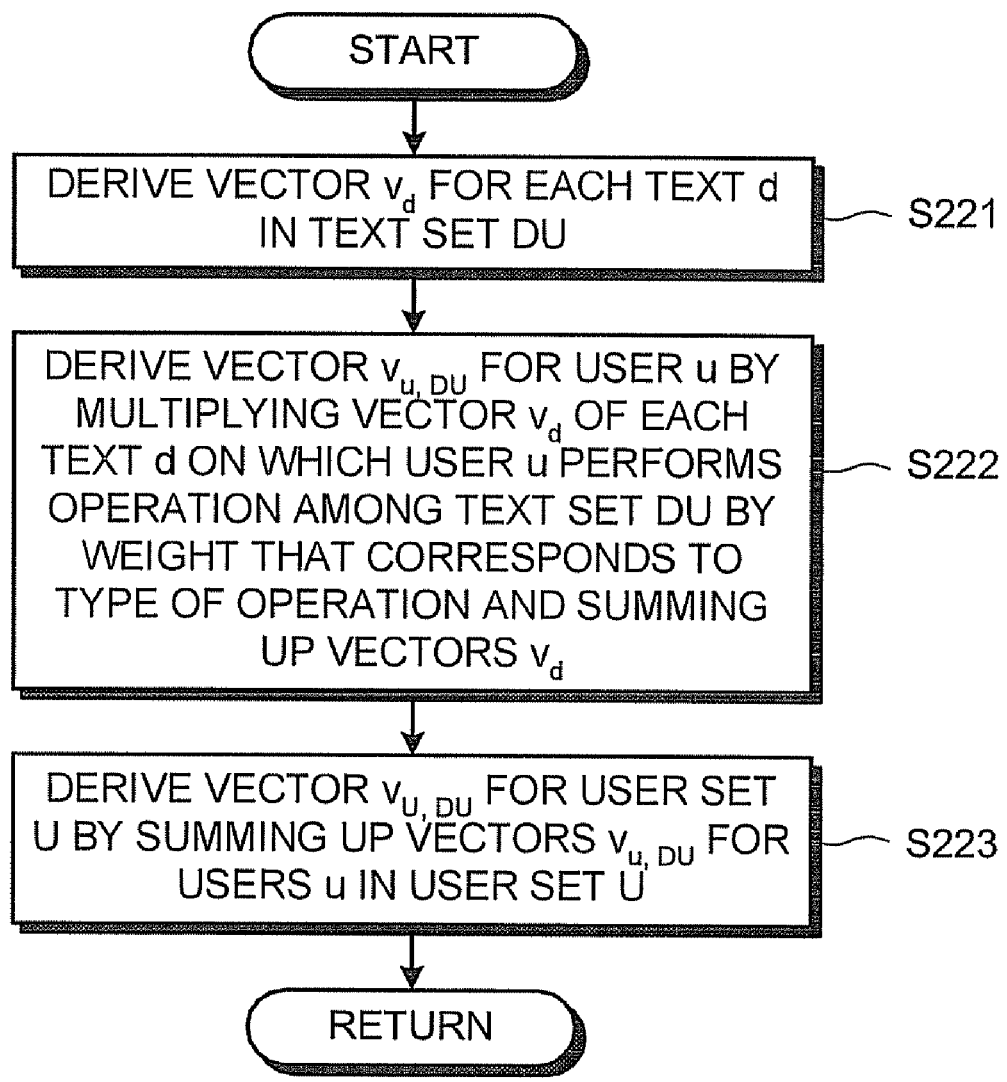
FIG. 11 is a flowchart of a vector calculating process.

FIG. 11 is a flowchart of the vector calculating process. First, the term-usage-frequency calculating unit 17 derives a vector v[d] for each text d of the text set DU shared by the user set U from equations (1) and (2) (step S221).

$$w_{t,d} = tf_{t,d} \log(|D|/df_t) \quad (1)$$

$$v_d = (w_{1,d}, w_{2,d}, \ldots, w_{m,d}) \quad (2)$$

Equations (1) and (2) are explained now. In the field of information searching, a weight called TF·IDF derived from equation (1) is often adopted as an indicator to determine whether a word in the text is characteristic enough to suitably represent the content of the text. As expressed by equation (1), the weight w[t, d] of a word t of a text d is derived from the frequency tf[t, d] at which the word t appears in the text d and the number of texts df[t] in which the word t appears among the target text set D (hereinafter, letters in square brackets denote subscripts). In the equation (1), |D| denotes the number of all texts in the target text set D, where D in equation (1) represents all the texts stored in the text-information storage unit (D ⊃ DU in general). The value for tf[t, d] is derived from the data table of FIG. 8B, while the value for df[t] is derived from the data table of FIG. 8A.

In addition to equation (1), other ways of calculations of TF·IDF have been suggested. In general, as tf[t, d] increases and df[t] decreases, the weight w[t, d] of the word t in the text d increases.

The derived weight w[t, d] can be expressed by equation (2) so that the characteristics of the text can be described in vector quantity. In the field of information searching, this is called a vector space model. In the equation, m denotes the number of different words, where the characteristic of the text d is expressed by a m-dimensional vector v[d].

Next, the term-usage-frequency calculating unit 17 applies the following equation (3) onto each user u in the user set U to find the sum of vectors v[d] of texts d onto which the user u has performed operations among the text set DU after multiplying the vectors by weights that correspond to the user's operations, thereby deriving a vector v[u, DU] of the user u (step S222).

$$v_{u,D} = \Sigma_{d \in D} a_{u,d} v_d \quad (3)$$

In equation (3), a[u, d] denotes a constant predetermined according to the operation that the user u performs on the text d, based on the history information stored in the history-information storage unit 16. For instance, a situation where possible types of operations are "create" and "browse" is considered. When the operation is to "create" a text, it is preferable that a[u, d] takes on a larger value than when the operation is to "browse" a text. By defining the value of a[u, d] according to the types of operations, the level of knowledge and interest (proficiency) that each user has in the operated text can be suitably represented. If the user u has never conducted an operation on the text d, a[u, d] is 0. In addition, a[u, d] does not always have to be a constant. For example, the value may monotonously decrease as time elapses after the time of the last operation so that the weight of the vector becomes smaller for a term included in a text to which the last operation has been conducted longer ago.

Through the process at step S22, a vector showing the characteristics of the terms used by the user u is obtained. When the subject for the calculation consists of only one user, the process is terminated. If a vector showing the characteristics of the terms used by the user set U of multiple users is to be obtained, the term-usage-frequency calculating unit 17 derives a vector v[U, DU] for the user set U by summing up the vectors v[u, DU] of the users u by equation (4) (step S223). Then, the system proceeds to step S23 in FIG. 10.

$$v_{U,D} = \Sigma_{u \in U} v_{u,D} \quad (4)$$

Now, the term-usage-frequency calculating unit 17 calculates a vector v[x, Dx] for the set Dx of all the texts that a user x has used by equations (1) to (3) (step S23). The calculated vector v[x, Dx] is independent of the user set to which the user x belongs or the like, and indicates characteristics of the terms that the user x generally uses.

The terminology-information presenting unit 18 calculates a difference between the vector v[U, DU] and the vector v[x, Dx], thereby deriving a vector v (step S24). The difference between the two vectors can be expressed by the following expression (5), where v1 represents the vector v[U, DU], and v2 represents the vector v[x, Dx].

$$v = v_1/|v_1| - v_2/|v_2| \quad (5)$$

In expression (5), the magnitudes of v1 and v2 are normalized before the vector v is obtained from the difference between the vectors v1 and v2. In other words, |v1| and |v2| represent the magnitudes of the vectors v1 and v2, respectively.

The values of the dimensional components of the vector v represent the weights of the terms corresponding to the dimensions, as indicated by expression (2). Thus, a large weight of the vector v means a high frequency of usage among the user set U and a low frequency of usage by the user x. In other words, it is likely that the user x has less knowledge and interest in the term than an average user of the user set U.

Thus, the terminology-information presenting unit 18 selects terms t whose dimensional component values, or in other words, whose weights are equal to or larger than a predetermined value, from among the terms t that correspond to the dimensions of the vector v (step S25). Thereafter, the terminology-information presenting unit 18 identifies one user u or more for whom the weight of each of the selected terms t in v[u, DU] is equal to or larger than a predetermined value (step S26). Such a user or users u use the terms t at a particularly high frequency among the user set U, and thus it is likely that the user/users are highly knowledgeable and interested in the terms, or in other words, specialists regarding the terms.

At step S25, the predetermined value that serves as a reference for the weight judgment may be set to an arbitrary value. However, it is preferable that the predetermined value be set to, for example, a value twice or more as large as the weight of each term in the vector v[x, Dx] so that any term whose weight exceeds the weight of the term in the vector v[x, Dx] can be selected from the vector v[U, DU]. In addition, the predetermined value that serves as a reference for the weight judgment at step S26 may be set to an arbitrary value. However, it is preferable that the predetermined value be set to, for example, a value larger than an average of weights of the terms (V1/|V1|) in the user set U so that any user who uses the terms more frequently (i.e., specialist) than an average user can be selected.

Thereafter, the terminology-information presenting unit 18 displays information on the terms t selected at step S25 and the users u identified at step S26 together on the displaying unit 6. The information is presented to the user x in this manner (step S27), and the process is terminated.

In general, there are more than one term t that is selected at step S25. To present terms particularly important for the user x, the weights of the terms t in the vector v may be usable to select terms in descending order of weight and preferentially presented in this order. As another embodiment, terms may be selected in descending order of the number of users who use the terms and preferentially presented in this order. Otherwise, terms may be selected in descending order of the number of texts in the text set DU that contain the terms and preferentially presented in this order. In any case, it is preferable that information on terms with higher necessity be presented with a higher priority so that the user x can communicate with other users in the user set U or browse and understand the texts in the text set DU shared by the user set U.

Figure 12:
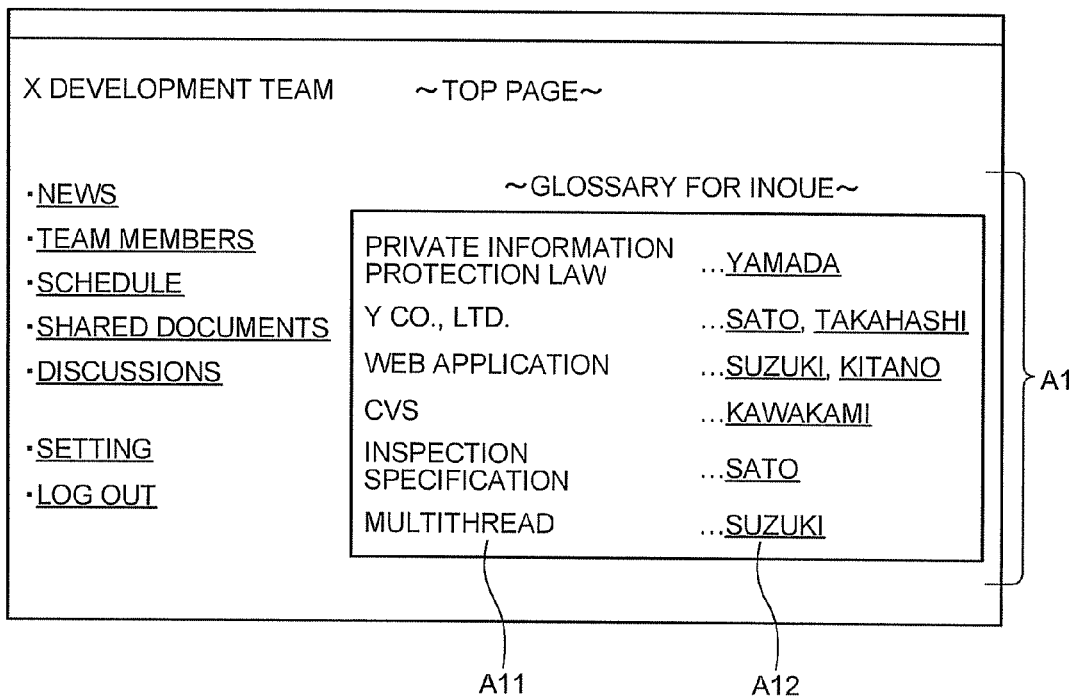
FIG. 12 is a schematic diagram of an example of a screen presenting terminology information.

FIG. 12 is a schematic diagram of an example of a screen presented on the displaying unit 6 by the terminology-information presenting unit 18. To show a practical example, the illustrated screen belongs to a structure in which the information sharing system 200 and the information presenting apparatus 100 are combined as illustrated in FIGS. 3 and 4. In this example of information presentation, it is assumed that a web application that has functions of a bulletin board system, text sharing, schedule sharing and the like is running on a system including the information presenting apparatus 100 and that a user named Inoue joins a set of users at work, "X Development Team". Inoue is going to share documents for the work with the team and communicate with other team members.

The result of the terminology information presenting process is indicated in the area A1 of FIG. 12. Terms such as "Private Information Protection Law", "Y Co., Ltd.", and "web application" are listed in the area A11 as possibly unfamiliar terms for the user Inoue. In addition, the names of the members of X Development Team, "Yamada", "Sato", "Takahashi", and others are listed in the area A12 as specialists who are highly knowledgeable and interested in these terms. By referring to the screen provided by the information presenting apparatus 100, Inoue can recognize that the terms presented in the area A12 are important at work and communications in X Development Team.

Furthermore, the structure may allow the user to ask Yamada, Sato, and other specialists about the terms and obtain information on these terms through the information presenting apparatus 100. More specifically, the information presenting apparatus 100 may be configured to be linked to an information search service or the like on the Internet so that the user can search through web pages or the like for information on the term with a click on the position of the term on the screen.

Moreover, modifications may be added to the terminology information presenting process of FIG. 10 so that other useful information presenting functions can be realized. In the following description, other embodiments of information presenting apparatus is discussed, where terms unknown for the user x that are contained in a specific text d are presented to the user x, together with the specialists in the terms during the terminology information presenting process.

Figure 13:
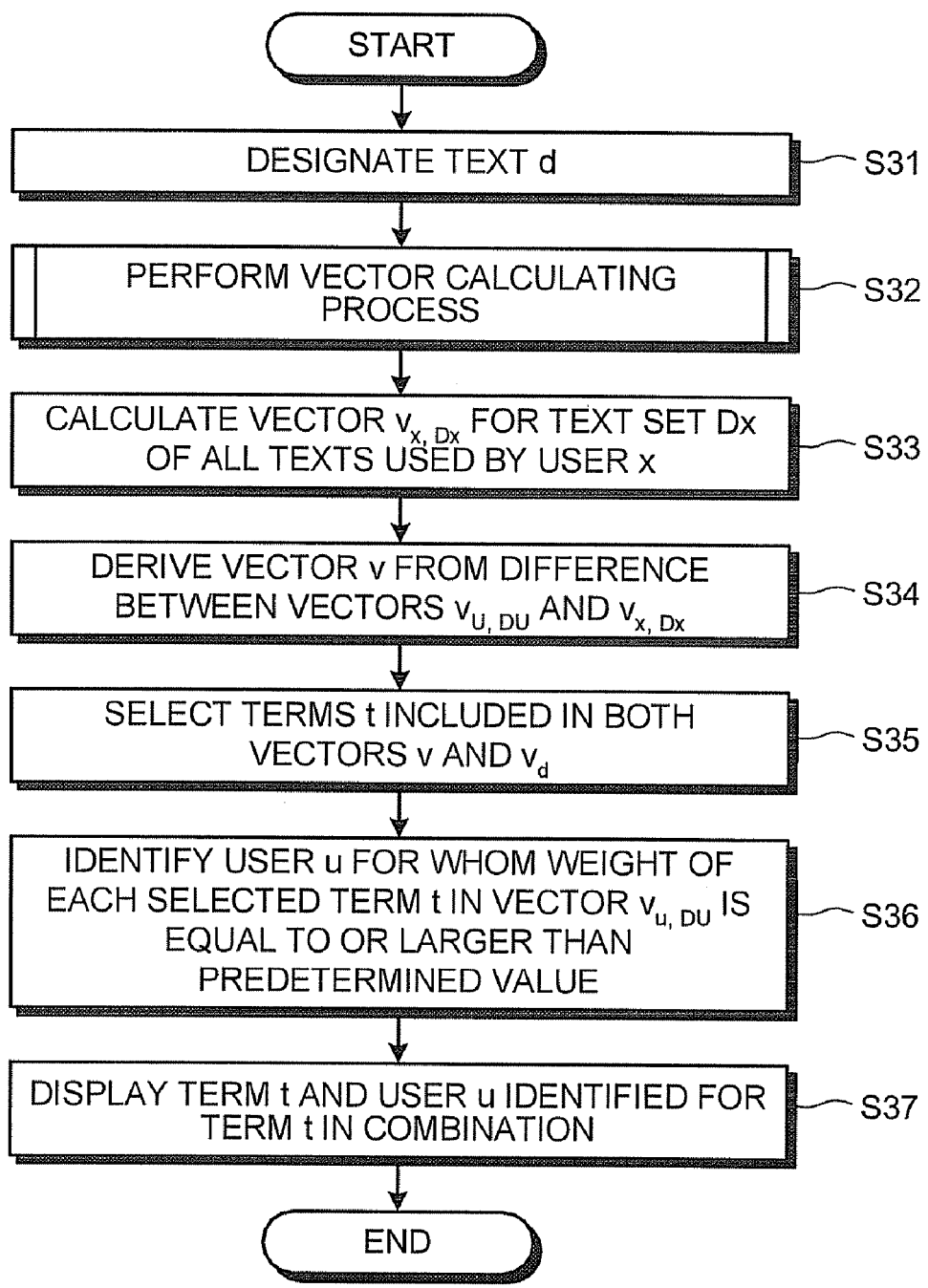
FIG. 13 is a flowchart for an example of a term extracting process.

FIG. 13 is a flowchart of the terminology information presenting process of presenting to the user x important terms in a specific text d and specialists in the terms. It is assumed here that, when a reference user x is browsing the specific text d, terms that are important in understanding this text as well as specialists in these terms are presented.

When the user x designates the specific text d by way of the operating unit 5 or the like and the designation signal is input into the CPU 1 (step S31), the term-usage-frequency calculating unit 17 executes a vector calculating process on the specific user set U and the users u who belong to the user set U (step S32) to derive the vectors v[d], v[u, DU], and v[U, DU].

The user set U may consist of users u designated by the user x from the operating unit 5, or may consist of predetermined users u. The vector calculating process at step S32 is the same as the vector calculating process at step S22, and thus the explanation thereof is omitted.

Next, the term-usage-frequency calculating unit 17 calculates the vector v[x, Dx] for the text set Dx of all the texts that the user x has used (step S33).

The terminology-information presenting unit 18 calculates a difference between the vector v[U, DU] and the vector v[x, Dx] to obtain the vector v (step S34).

Next, the terminology-information presenting unit 18 selects any dimensional component that is 0 in neither vector v nor v[d], or in other words any term t that is included in both vectors (step S35). The terminology-information presenting unit 18 identifies one user u or more for whom the weights of the selected terms t in v[u, DU] are equal to or larger than a predetermined value (step S36).

At step S36, the predetermined value for the weight judgment may be set to an arbitrary value. It is preferable that, for example, the value is larger than an average of the weights of the terms (V1/|V1|) in the user set U so that users who use the terms more frequently (i.e., specialists) than an average user can be selected.

Then, the terminology-information presenting unit 18 displays the information on the terms t selected at step S35 and the users u identified at step S36 together on the displaying unit 6. The information is thereby presented to the user x (step S37), and the process is terminated.

FIG. 14 is a schematic diagram of an example of a screen presented as a result of the terminology information presenting process of FIG. 13. In relation to the text d that the user x is browsing (D1 in FIG. 14), the terms selected at step S35, in other words, terms that the user x is possibly unfamiliar with are emphasized on the display (see E1 to E3 in FIG. 14). In addition, as shown in the area A2 of FIG. 14, the terms selected at step S35 and the specialists therein found out at step S36 are listed in the same manner as the area A1 of FIG. 12. Thus, the user can recognize the terms important in understanding the text by referring to such information, and, if necessary, can acquire knowledge in the terms by asking the specialists.

Modifications may be added to the terminology information presenting process of FIG. 10 to realize other useful information presenting functions. In the following description, as another embodiment of an information presenting apparatus, the terminology information presenting process is explained, where unknown terms for a user u who belongs to the user set U are presented from among terms included in the text d created by the user x.

Figure 15:
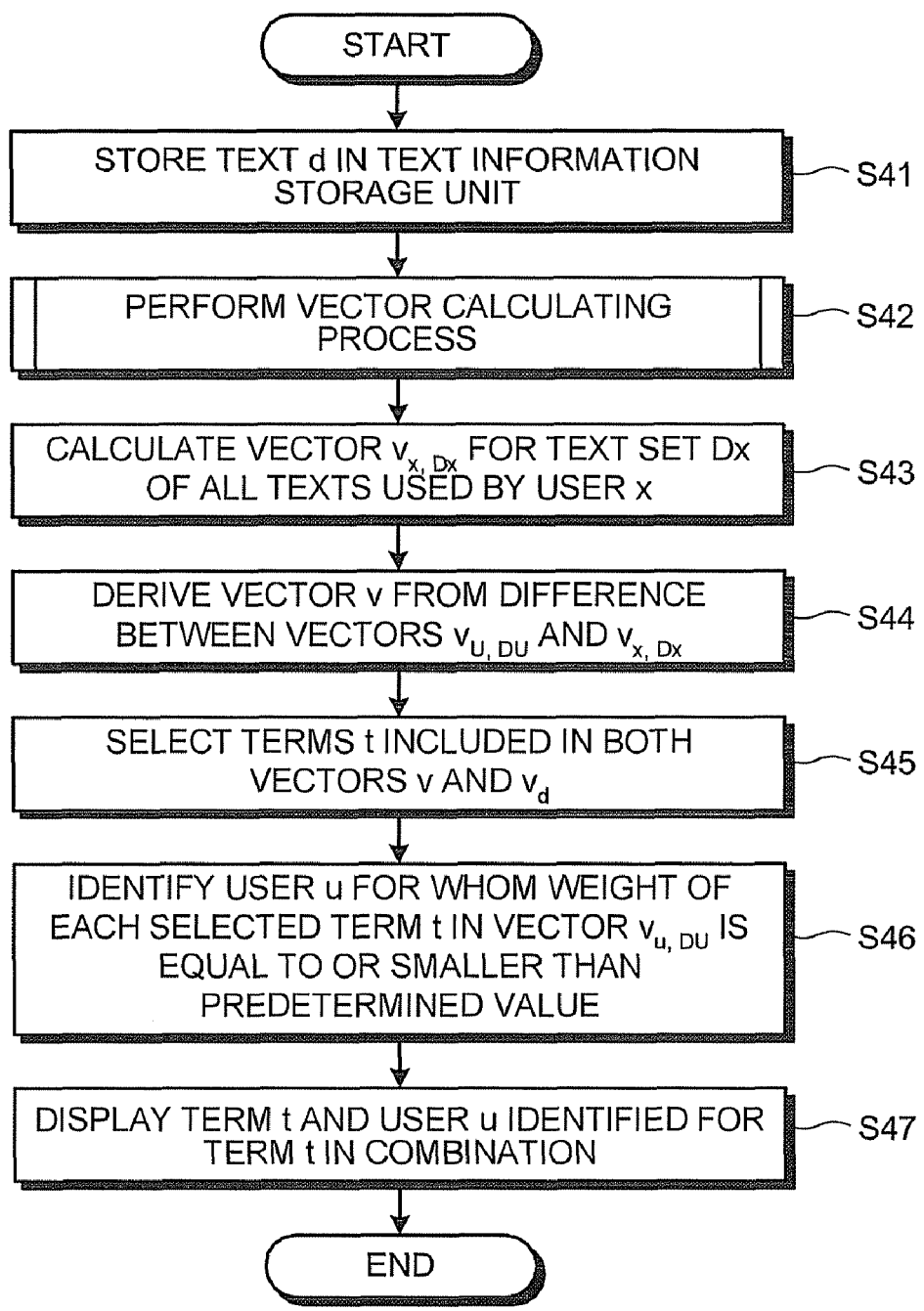
FIG. 15 is a flowchart for an example of a terminology information presenting process.

FIG. 15 is a flowchart of the terminology information presenting process of presenting unknown terms among those included in the specific text d to the specific user u who belongs to the user set U. It is assumed in this process that, when a text d that the reference user x has created is submitted to the user set U, the text d includes terms that are unknown to the user set U.

First, when the text d created by the user x is saved into the text-information storage unit 11 (step S41), the term-usage-frequency calculating unit 17 executes a vector calculating process onto the user set U and the users u who belong to the user set U (step S42), thereby deriving the vectors v[d], v[u, DU], and v[U, DU].

The user set U may consist of users u designated by the user x from the operating unit 5 or the like. Or the user set U may consist of predetermined users u. The vector calculating process at step S42 is the same as the vector calculating process at step S22, and thus the explanation thereof is omitted.

Next, the term-usage-frequency calculating unit 17 calculates the vector v[x, Dx] for the text set Dx of all the texts used by the user x (step S43).

The terminology-information presenting unit 18 calculates a difference between the vector v[U, DU] and the vector v[x, Dx], thereby deriving the vector v (step S44).

Thereafter, the terminology-information presenting unit 18 selects terms of weights in the vector v are equal to or smaller than a predetermined value and also dimensional component of which in both vectors v and v[d] is not 0, or in other words, terms that are included in both vectors (step S45). In contrast to the terms obtained through the terminology information presenting process of FIG. 10, the terms t selected here are ones that are used by the user set U at a low frequency but used by the user x at a high frequency.

The predetermined value adopted as a reference in the weight judgment at step S45 can be set to any arbitrary value. It is preferable that the value is set to be a negative value so that terms whose weights are below the weight of the term in the vector v[x, Dx] are selected from the vector v[U, DU].

Then, the terminology-information presenting unit 18 identifies one user u or more for whom the weight of each of the selected terms t in v[u, DU] is equal to or below the predetermined value (step S46). The predetermined value adopted as a reference in the weight judgment at step S46 may be set to any arbitrary value. It is preferable that the value is set to be smaller than the average of weights (V1/|V1|) of the terms in the user set U so that users who use the terms at a lower frequency (i.e., those who are inexpert) than an average user are selected. The obtained users u are those who use the terms t least frequently among the user set U, and possibly have least knowledge and interest in those terms.

The terminology-information presenting unit 18 displays information on the terms t selected at step S45 and the user u identified at step S46 in combination on the displaying unit 6. The information is thereby presented to the user x (step S47), and the process is terminated.

FIG. 16 is a schematic diagram of an example of a screen displayed in the terminology information presenting process of FIG. 15. When the text created by the user (D2 in FIG. 16) is submitted to other users Aoki, Kuroda, and Shirakawa, the terms selected at step S45, or in other words, terms that are possibly incomprehensible to the receivers are emphasized in a manner as indicated in E4 to E6. Furthermore, the area A3 indicates particularly which of the users would not understand these words. In general, more than one term t tends to be selected at step S45. The configuration may be such that the terms are preferentially selected and listed in order of increasing number of users of the terms. Otherwise, the terms may be preferentially selected and listed in order of increasing number of texts among the text set DU in which the terms are included.

By referring to such information, the user who creates the text recognizes that the text contains terms that may not be suitable for the receivers of the text or may require an explanation to the receivers. This allows the user to change the terms in the text or add an explanation for the terms, if necessary. Hence, the embodiment facilitates information sharing and communications among the users.

According to the embodiment, a difference between the frequencies at which a particular user and other users use each term is calculated, and terms for which the difference is equal to or higher than a predetermined value are selected and listed. Hence, when the user shares information with other users, the user recognizes which term the user oneself is relatively unfamiliar with and which term other users are relatively unfamiliar with.

As a result, when the user conducts a job or communications with other users or other organizations, the user can recognize terms frequently used by one side but seldom used by the other side. In addition, if there is any term necessary to conduct the job, the user can ask a specialist in relation to the term, or can avoid a term that should not be used and paraphrase the term. Business information sharing and communications can thereby be facilitated.

According to the embodiment, a program executed on the information presenting apparatus i00 is stored in advance in the ROM 2 or the like, but the configuration is not limited thereto. The program may be stored as a file in an installable format or executable formal in a computer readable storage medium such as a CD-ROH, a flexible disk (FD), a CD-R, and a digital versatile disk (DVD). Furthermore, the program may be stored in a computer connected to a network such as the Internet so that the program can be downloaded through the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for outputting information comprising:
   a computer readable storage medium;
   a terminology-information storage unit;
   a history-information storage unit;
   a term extracting unit that extracts terms contained in a text from each of a plurality of texts;
   a first storage control unit that stores, in the terminology-information storage unit, the terms extracted in association with text identification information of the text that contains the terms;

a history-information acquiring unit that acquires history information indicating a history of operations performed by users on the text;

a second storage control unit that stores, in the history-information storage unit, history information in association with user identification information of each of the users who has performed an operation and the text identification information of the text subjected to the operation;

a usage-frequency calculating unit that calculates, for each of the user identification information, a frequency of usage of each of the terms contained in the text, which is identified by the text identification information that is associated with the user identification information, based on the terms stored in the terminology-information storage unit for each of the text identification information;

a term selecting unit that calculates, based on the frequency of usage of each of the terms, a relative difference between a specific user identification information and other user identification information contained in the user identification information of the users and selects terms for which the difference is equal to or larger than a predetermined value; and an information outputting unit that outputs the terms selected to an output device, wherein the term selecting unit selects the terms for which the frequency of usage for the user identification information of the specific user is lower or higher than the frequency of usage for the user identification information of the other users, with respect to the user identification information of the specific user and that of the other users stored in the history-information storage unit, based on the frequency of usage of each of the terms, a user selecting unit that selects an user identification information for which the frequency of usage for each of the terms selected by the term selecting unit is equal to or larger, or equal to or smaller than a predetermined value from among the user identification information of the other users, wherein the information outputting unit outputs the terms selected by the term selecting unit and the user identification information corresponding to the terms in association with each other.

2. The apparatus according to claim 1, wherein the information outputting unit outputs the terms selected by the term selecting unit in descending order of number of users who use the terms.

3. The apparatus according to claim 1, wherein the information outputting unit outputs the terms selected by the term selecting unit in descending order of number of texts that contain the terms.

4. The apparatus according to claim 1, wherein the information outputting unit outputs the terms selected by the term selecting unit in ascending order of number of users who use the terms.

5. The apparatus according to claim 1, wherein the information outputting unit outputs the terms selected by the term selecting unit in ascending order of number of texts that contain the terms.

6. A computer program product having a computer readable storage medium including programmed instructions for outputting information, wherein the instructions, when executed by a computer having a terminology-information storage unit and a history-information storage unit, cause the computer to perform:

extracting terms contained in a text from each of a plurality of texts; storing, in the terminology-information storage unit, the extracted terms in association with text identification information of the text that the extracted terms;

acquiring history information indicating a history of operations performed by users on the text;

storing, in the history-information storage unit, the history information in associated with user identification information of each of the users who has performed implement an operation and the text identification information of the texts subjected to the operation;

calculating for each of the user identification information, a frequency of usage of each of the terms contained in the text, which is identified by the text identification information that is associated with the user identification information, based on the terms stored in the terminology-information storage unit for each of the text identification information;

calculating, based on the frequency of usage of each of the terms, a relative difference between a specific user identification information and other user identification information contained in the user identification information of the users and selecting terms for which the difference is equal to or larger than a predetermined value; and outputting the selected terms to an output device, wherein a term selecting unit selects the terms for which the frequency of usage for the user identification information of the specific user is lower or higher than the frequency of usage for the user identification information of the other users, with respect to the user identification information of the specific user and that of the other users stored in the history-information storage unit, based on the frequency of usage of each of the terms, a user selecting unit that selects an user identification information for which the frequency of usage for each of the terms selected by the term selecting unit is equal to or larger, or equal to or smaller than a predetermined value from among the user identification information of the other users, wherein an information outputting unit outputs the terms selected by the term selecting unit and the user identification information corresponding to the terms in association with each other.

7. A computer-implemented method for outputting information comprising steps implemented by a computer of:

extracting, by the computer, terms contained in a text from each of a plurality of texts;

storing, by the computer, in a terminology-information storage unit, the extracted terms in association with text identification information of the text that contains the extracted terms;

acquiring, by the computer, history information indicating a history of operations performed by users on the text;

storing, by the computer, in the history-information storage unit, the history information user identification information of each of the users who has performed an operation and the text identification information of the texts subjected to the operation;

calculating, by the computer, for each of the user identification information, a frequency of usage of each of the terms contained in the text, which is identified by the text identification information that is associated with the user identification information, based on the terms stored in the terminology-information storage unit for each of the text identification information;

calculating, by the computer, based on the frequency of usage of each of the terms, a relative difference between a specific user identification information and other user identification information contained in the user identification information of the users the frequency of usage of each of the terms for the stored user identification information of a specific user and the frequency of usage of each of the terms for the user identification information of other users, based on the frequency of usage of each of the terms, and selecting terms for which the difference is equal to or larger than a predetermined value; and outputting, by the computer, the selected terms to an output device, wherein a term selecting unit selects the terms for which the frequency of usage for the user identification information of the specific user is lower or higher than the frequency of usage for the user identification information of the other users, with respect to the user identification information of the specific user and that of the other users stored in the history-information storage unit, based on the frequency of usage of each of the terms, a user selecting unit that selects an user identification information for which the frequency of usage for each of the terms selected by the term selecting unit is equal to or larger, or equal to or smaller than a predetermined value from among the user identification information of the other users, wherein an information outputting unit outputs the terms selected by the term selecting unit and the user identification information corresponding to the terms in association with each other.

* * * * *